United States Patent [19]

Zaunberger et al.

[11] 4,363,389

[45] Dec. 14, 1982

[54] VEHICLE TRANSMISSION CONTROL SYSTEM

[75] Inventors: Franz X. Zaunberger; Artur Kugler, both of Augsburg, Fed. Rep. of Germany

[73] Assignee: Zahnräderfabrik Renk A.G., Augsburg, Fed. Rep. of Germany

[21] Appl. No.: 177,565

[22] Filed: Aug. 13, 1980

[30] Foreign Application Priority Data

Aug. 16, 1979 [DE] Fed. Rep. of Germany ....... 2933075

[51] Int. Cl.³ .................... B60K 41/08; B60K 41/28
[52] U.S. Cl. ........................... 192/0.042; 192/0.055; 192/0.076; 192/0.09; 192/0.094; 192/103 R
[58] Field of Search .............. 192/0.042, 0.044, 0.052, 192/0.055, 0.076, 0.09, 0.092, 0.094, 3 M, 103 R; 74/866

[56] References Cited

U.S. PATENT DOCUMENTS

| | | | |
|---|---|---|---|
| 2,760,610 | 8/1956 | Prachar | 192/0.052 |
| 2,907,423 | 10/1959 | Jaeschke | 192/103 R |
| 2,924,313 | 2/1960 | Binder et al. | 192/0.09 |
| 3,303,912 | 2/1967 | Fujimoto et al. | 192/0.055 |
| 3,542,173 | 11/1970 | Kratzenberg et al. | 192/0.09 |
| 4,120,373 | 11/1978 | Fleischer | |
| 4,262,335 | 4/1981 | Ahlen et al. | 74/866 X |
| 4,262,783 | 4/1981 | Scarrott et al. | 192/0.09 |

FOREIGN PATENT DOCUMENTS

| | | | |
|---|---|---|---|
| 2753702 | 6/1972 | Fed. Rep. of Germany | 192/0.094 |
| 2415954 | 2/1977 | Fed. Rep. of Germany | . |
| 2717256 | 11/1977 | Fed. Rep. of Germany | . |
| 736926 | 9/1932 | France | . |
| 2387137 | 12/1978 | France | 192/0.055 |
| 1103052 | 2/1968 | United Kingdom | . |
| 1249500 | 10/1971 | United Kingdom | . |
| 1297123 | 11/1972 | United Kingdom | . |
| 1476610 | 6/1977 | United Kingdom | . |

*Primary Examiner*—George H. Krizmanich
*Attorney, Agent, or Firm*—Natter & Natter

[57] ABSTRACT

A control system for an automatic vehicle transmission includes a clutch mechanism interconnecting the driving connection between the vehicle engine and the vehicle driving wheels. The control system operates to automatically disengage the clutch when the braking system is actuated and the vehicle speed is reduced to a predetermined level with the accelerator in idle position. The clutch automatically engages when any of the three parameters have changed from predetermined levels. The automatic control system serves to reduce fuel consumption and exhaust emissions at vehicle idling by reducing transmission drag, yet provides smooth shifting and permits the engine and transmission to assist in vehicle braking.

10 Claims, 2 Drawing Figures

VEHICLE TRANSMISSION CONTROL SYSTEM

BACKGROUND OF THE INVENTION

1. Field of the Invention

This invention relates generally to vehicle transmissions and more particularly a control system associated with an automatic transmission clutch mechanism which reduces engine drag when a vehicle is idling.

2. Brief Description of the Prior Art

In many vehicles with automatic transmissions, a fluid coupling, torque converter or hydrodynamic clutch was driven by the engine crankshaft. When the vehicle was not in motion and the engine idling, the engine was still driving the torque converter, fluid coupling or hydrodynamic clutch and thus expending energy to overcome the flow resistance caused by a stationary transmission output shaft. As a result, fuel was unnecessarily consumed and exhaust emissions generated especially in city driving.

In published German Pat. DE-OS No. 2 545 798, a control device which provided reduced fuel consumption and minimized exhaust emissions was disclosed. Among the problems which may have been encountered when a clutch was utilized for the purpose of disengaging an engine from a transmission at idle speeds was that shifting shocks were readily generated during acceleration especially when the accelerator was depressed rapidly and the clutch was engaged at high engine torque and engine speed.

Another problem which was encountered in conjunction with the employment of clutch mechanisms in automatic transmissions was that it was undesirable and often dangerous for a clutch to disengage at rapid vehicle speed since the engine and transmission would not be available to assist in vehicle braking.

SUMMARY OF THE INVENTION

In compendium, the present invention comprises an automatic control system for the operation of a hydraulically actuated clutch in an automatic transmission. The clutch is engaged for the purpose of mechanically linking the engine to the part of the transmission connected with the vehicle driving wheels. The clutch may be positioned intermediate the engine crankshaft and a torque converter, hydrodynamic clutch or fluid coupling of the automatic transmission and is automatically actuated to disengage when the following conditions are met:

(a) the vehicle engine is idling,
(b) the vehicle speed is below a set value or the vehicle has stopped, and
(c) the brake pedal is engaged.

The control system includes a plurality of sensors interconnected to actuate an electromagnetically operable fluid valve which in turn operates the clutch. The automatic control system includes a vehicle speed sensor, an accelerator position sensor and a braking system sensor. When all three sensors are simultaneously tripped, the electromagnetic valve changes state and control fluid is applied to the clutch mechanism for disengagement. If any of the sensors indicate a transfer to other than the preset value, the electromagnetic valve is reactuated to return to the initial position and the clutch is engaged.

In an alternate embodiment, existing automatic transmission control sensors are utilized with the addition of a braking system sensor. A control circuit is employed to disengage the clutch only when the vehicle speed is reduced to a certain level, the accelerator is in idle position and the braking system actuated.

From the foregoing compendium, it will be appreciated that it is an object of the present invention to provide a vehicle transmission control system of the general character described which is not subject to the disadvantages of the prior art as aforementioned.

A further object of the present invention is to provide a vehicle transmission control system which promotes economical fuel usage while maintaining safe vehicle operation.

Another object of the present invention is to provide an automatic transmission control system of the general character described which reduces exhaust emissions at engine idling states.

A further object of the present invention is to provide an automatic transmission control system of the general character described which promotes reduced drag when a vehicle engine is at idle.

Another object of the present invention is to provide a vehicle transmission control system of the general character described which promotes smooth transmission shifting.

Yet another object of the present invention is to provide a vehicle transmission control system of the general character described which serves to disengage a clutch interconnecting the driving and driven parts of an automatic transmission and which automatically reengages the clutch prior to vehicle acceleration.

Other objects of the invention in part will be apparent and in part will be pointed out hereinafter.

With these ends in view, the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
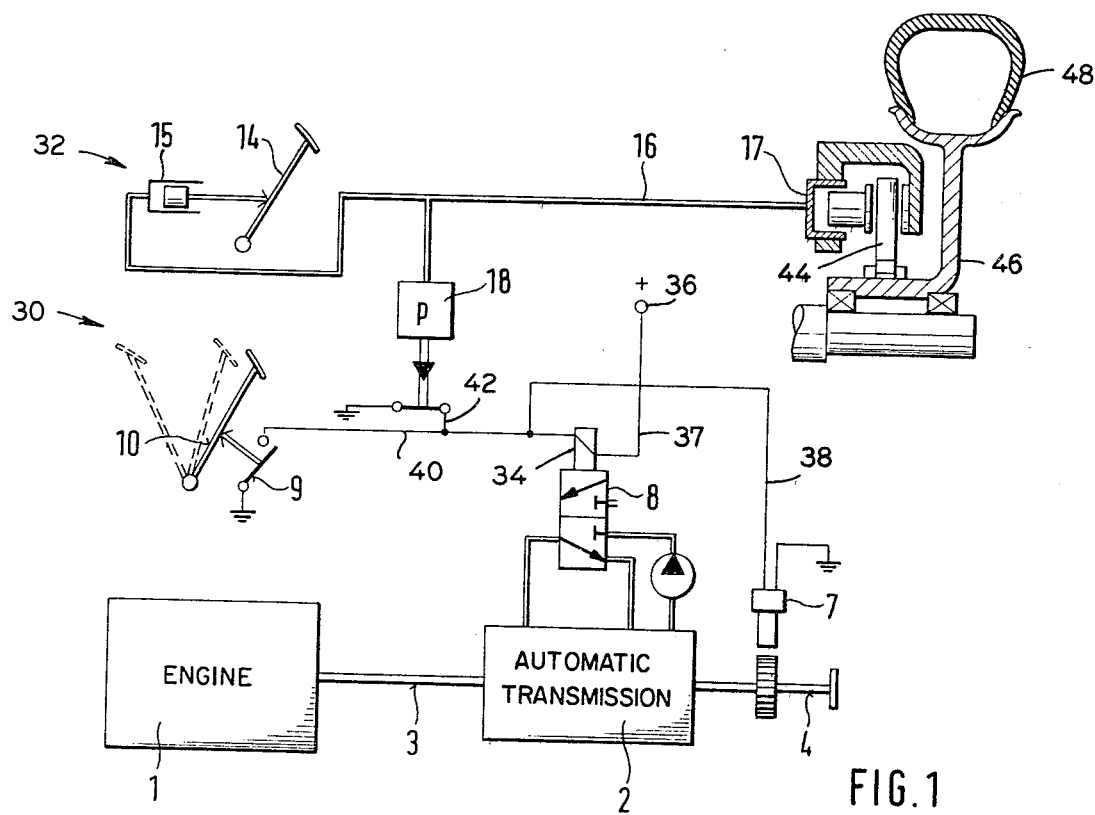
FIG. 1 is a schematized representation of various components of a motor vehicle including an automatic transmission, and a control system constructed in accordance with and embodying the invention and showing an electromagnetic control valve which actuates a transmission cut-off clutch as a function of vehicle speed, accelerator pedal position and the braking system condition.

Referring now in detail to the drawings wherein typical exemplary embodiments of the invention are illustrated, the reference numeral 1 denotes generally a motor vehicle engine having an output shaft 3. The output shaft 3 drives an automatic transmission 2 to propel the vehicle through a transmission output shaft 4 which engages the vehicle driving wheels (not shown).

Pursuant to the present invention, a vehicle transmission control system 30 is provided for temporarily disengaging the driving connection between the engine output shaft 3 and a part of the transmission connected with the transmission output shaft 4. The disconnection is desirably effected when the vehicle is at a relatively low speed or stopped, with an accelerator pedal 10 in idling position and with a minimum pressure, e.g. 10% and 30% of maximum pressure, applied to a vehicle braking system 32.

Accordingly, the present invention provides for the control of a cut-off clutch 5 in the automatic transmission 2 as a function of vehicle speed, accelerator pedal position and braking system condition. In order to prevent shifting shocks, it is desirable for the cut-off clutch to be engaged when the engine is still idling rather than at high speeds. Furthermore, it is desirable to have the clutch engaged during braking at high and moderate speeds in order to provide braking assistance through the engine and transmission.

The control system 30 of the present invention includes an electromagnetically operated fluid valve 8 which interconnects a cut-off clutch actuating mechanism and a pressurized fluid supply. The valve 8 includes a coil 34 which, when energized, causes the control fluid to assume a flow path which results in engagement of the cut-off clutch 5.

The transmission 2 additionally includes a conventional torque converter 50 and a mechanical gearing assembly 52 (illustrated in block format). The valve 8 includes a body having a pair of flow paths indicated by arrows with the valve body being schematically indicated as movable to selectively interconnect ports of each flow path between fluid lines which are stationary.

Illustrated in FIG. 1 is a valve body position wherein controlling fluid pressure is not applied to the clutch 5 so that the clutch 5 is opened. A clutch fluid line 54 extends to a valve port 56 and through the valve flow path to a drain port 58 where it interconnects a fluid drain line running to a sump 60. A pressure line 62 extends into the sump and includes a pump. The pressure line 62 engages the valve body at a closed port.

To engage the clutch 5, the coil 34 moves the valve body downwardly relative to the fluid lines. With the valve body in its downward position (not shown), the pressure line 62 is registered with an upper flow path port 64 for interconnection to the clutch fluid line 54 through a further port 66 thereby causing pressurized fluid to actuate a clutch engaging mechanism. It should be noted that in this position of the valve body, the sump drain fluid line will be registered with a closed port 68. When the coil 34 is not energized, the valve 8 assumes a position which diverts the flow of control fluid to an alternate path thereby disengaging the cut-off clutch.

The control circuit for the solenoid 34 includes a positive power supply 36 and a lead 37 from the power supply 36 to the coil 34. The coil circuit is selectively completed through a ground connection which is effected through any one of a plurality of parallel wired sensor switches, each of which is operatively interconnected with one of the vehicle parameters.

A speed sensor switch 7 interconnects the coil 34 to ground and is normally closed when the vehicle is moving. The switch 7 is operable as a function of the speed of rotation of the transmission output shaft 4 which is interconnected to the vehicle drive wheels. When the vehicle speed decreases below a certain perdetermined range, the switch 7 opens, interrupting a ground connection from the coil through a lead 38.

A parallel ground connection from the coil 34 is provided through a further lead 40 which is connected to a grounded accelerator switch 9. The switch 9 is operable as a function of the position of the accelerator pedal 10. When the operator's foot is removed from the accelerator pedal 10, the pedal returns to an idle position and the switch 9 is opened, thus interrupting a ground connection for the coil 34 through the lead 40. Of course, the switch 9 may be set to open at an accelerator pedal position which indicates reduced fuel flow approaching, rather than at idle position.

A further parallel ground connection for the coil 34 is provided through a lead 42 which is connected to ground through a conventional pressure switch 18. The pressure switch 18 opens when a minimum pressure is applied in hydraulic brake line 16 by depression of a brake pedal 14. The brake pedal 14 in turn drives a piston of a master cylinder 15 to pressurize the line 16 and actuate a wheel cylinder 17. The wheel cylinder 17 is illustrated as a disc brake caliper cylinder which causes brake pads to engage a wheel disc 44. Additionally shown in FIG. 1 is a wheel rim 46 and a tire 48.

The pressure switch 18 is designed to open, thereby interrupting the ground connection from the coil 34 through the lead 42 when a minimum pressure, e.g. 10% through 30% of the maximum pressure, is applied to the brake system 32. In lieu of a pressure switch, a position sensing switch such as the accelerator switch 9, may be employed in conjunction with the brake pedal 14.

It is apparent that the coil 34 will be energized when any of the switches 7, 9 or 18 are closed. Thus, the cut-off clutch in the transmission 2 will be engaged when any of the switches 7, 9 or 18 are closed. Conversely, in order to disengage the cut-off clutch, the coil 34 must be deenergized, i.e. all three switches 7, 9 and 18 must be opened. for this to occur, the vehicle speed must be below the predetermined level, the accelerator pedal must be at idle or another predetermined position, and the brakes must be applied to the minimum pressure.

If an operator is braking a vehicle at high or moderate speed, although the minimum pressure level has been reached in the braking system 32, and the operator's foot may be off the accelerator pedal 10, the coil circuit will still be completed through the speed sensing switch 7 and the cut-off clutch will remain engaged to provide braking assist through the engine. Once the vehicle slows to the predetermined level, the speed sensing switch 7 will open, deenergizing the coil 34 and disengaging the cut-off clutch.

In order to promote smooth shifting, the cut-off clutch is engaged while the vehicle is standing still and before acceleration through either the brake pressure switch 18 or the accelerator switch 9. For example, as the operator removes his foot from the brake pedal, the coil 34 will be energized through the line 42 prior to complete release of the brake pedal. This occurs because less than minimum brake pressure has been reached. The remaining brake pressure is sufficient however to prevent the vehicle from moving. During subsequent acceleration of the vehicle, no shifting shock will occur because the clutch has not been engaged at high engine speed and torque.

The accelerator switch 9 which monitors fuel flow to the engine 1 will cause the cut-off clutch to reengage upon slight acceleration (depression of the accelerator pedal 10) even when the brake pedal is still applied.

Because the brake pressure switch 18 will cause the cut-off clutch to reengage at or prior to complete release of the brake pedal and the accelerator switch 9 will cause the cut-off clutch to reengage as soon as the accelerator pedal 10 is depressed, the driving connection will become immediately operative and the vehicle will not roll backwards when stopped on an upward slope.

The cut-off clutch itself and the hydraulic control for the engagement and disengagement of the clutch is conventional. Furthermore, electric rather than hydraulic controls for engagement and/or disengagement of the cut-off clutch may be provided.

The cut-off clutch may be positioned between the engine output shaft 3 and the torque converter, hydrodynamic clutch or fluid coupling of the automatic transmission 2. When the clutch is disengaged, the engine which is running at idle speed does not have to overcome the drag or flow resistance of the torque converter, hydrodynamic clutch or fluid coupling.

It should be emphasized, however, that the cut-off clutch may be positioned elsewhere in the automatic transmission and will reduce flow resistance in the torque converter, hydrodynamic clutch or fluid coupling when disengaged since components of the transmission forward of the cut-off clutch will be free to rotate without the resistance encountered by a slowly rotating or fixed output shaft 4. As a result, decreased flow resistance is achieved and the engine will idle under reduced load and with reduced emissions.

Figure 2:
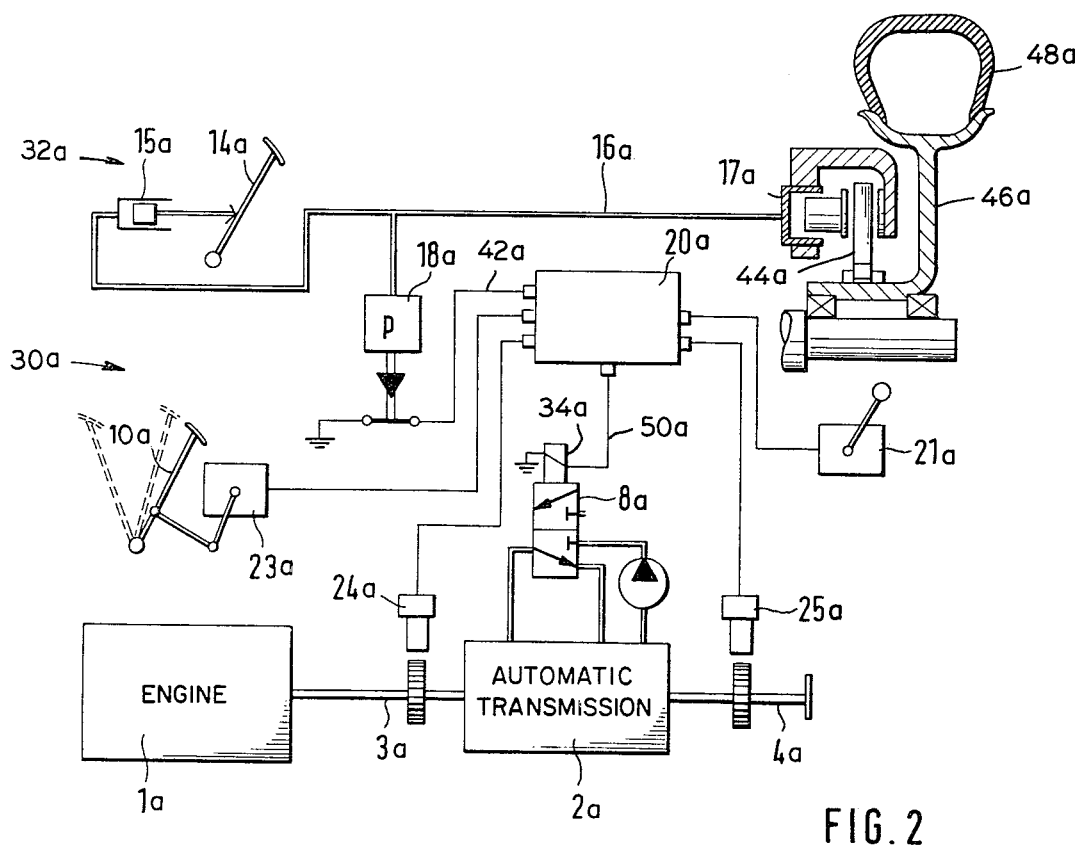
FIG. 2 is a similar schematized representation of various components of a motor vehicle including an automatic transmission and a vehicle transmission control system constructed in accordance with an alternate embodiment of the invention and wherein various sensing devices for customary operation of the transmission are employed for the purpose of actuating the cut-off clutch in conjunction with a vehicle braking sensor.

Referring now in detail to an alternate embodiment of the invention as shown in FIG. 2, like numerals have been used to denote like components of the prior embodiment, however bearing the suffix "a." The alternate embodiment of the vehicle transmission control system 30a is similar to the embodiment previously disclosed, however in lieu of providing vehicle speed and accelerator pedal position sensors specifically for cut-off clutch control, existing sensors conventionally provided for the control of an automatic transmission 2a are adapted for conjunctive use with the present control system.

A vehicle engine 1a includes an output shaft 3a which drives an automatic transmission 2a having a transmission output shaft 4a. Pursuant to the alternate embodiment of the invention, conventional sensing transmitters which are used to control the operation of the automatic transmission 2a are additionally employed as sensing elements of the control system in conjunction with a brake pressure switch 18a. For the purpose of controlling the automatic gear shifting of the transmission 2a, the vehicle is equipped with a gear shift switch 21a, an accelerator pedal 10a having a position transmitter 23a, an engine speed tachometer 24a and a transmission output speed tachometer 25a.

The signals of all of the sensors 21a, 23a, 24a and 25a are transmitted to a single electronic switching device 20a which may comprise a digital or analog unit. In addition to the inputs from the conventionally employed sensors, the brake pressure switch 18a provides a signal which is fed to the switching device 20a through a lead 42a.

The switching device 20a controls the shifting operation of the automatic transmission 2a through a control line 70a and, pursuant to the present invention, controls an electromagnetic valve 8a by providing a positive voltage supply through a lead 50a to a coil 34a thus energizing the coil.

It should be appreciated that the electronic switching device 20a will turn off the coil 34a only when the three monitored parameters simultaneouly reach the predetermined values; that is, when the vehicle speed, i.e. the speed of the transmission output shaft 4a is at or below a predetermined low value as sensed by the tachometer 25a, the accelerator pedal 10a has returned to an at or near idle position as detected by the transmitter 23a and, in addition, the brake pressure switch 18a opens, indicating that a minimum braking pressure (10% through 30% of maximum value) has been applied to a braking system 32a.

As discussed with regard to the prior embodiment, if any of the measured parameters change its value, e.g. a brake pedal 14a is partially released, the accelerator 10a is depressed or the vehicle is travelling at a speed exceeding the minimum value, the cut-off clutch will not disengage, or, if disengaged, will reengage.

Thus, it will be seen that there is provided a vehicle transmission control system which achieves the various objects of the invention and which is well suited to meet the conditions of practical use.

Since various possible embodiments might be made of the present invention and since various changes might be made in the exemplary embodiments shown herein, it is to be understood that all matter herein described or shown in the accompanying drawings is to be interpreted as illustrative and not in a limiting sense.

Having thus described the invention, there is claimed as new and desired to be secured by Letters Patent:

1. A transmission control system adapted for controlling the operation of a vehicle automatic transmission having a fluid coupling and means for interrupting the driving connection between a vehicle engine and a transmission output shaft, the control system including vehicle speed sensing means, brake sensing means for detecting when the vehicle brakes have been applied, control means, and means interconnecting the speed sensing means and the brake sensing means to the control means, the control means including means actuating the interrupting means when the speed sensing means indicates that the vehicle speed is at or below a predetermined value and simultaneously the brake sensing means indicates that a minimum predetermined braking force has been applied, the means for actuating the interrupting means including means for restoring the driving connection prior to complete release of braking force whereby reduced engine load will be achieved with smooth vehicle operation during braking and subsequent acceleration.

2. A transmission control system adapted for controlling the operation of a vehicle automatic transmission constructed in accordance with claim 1 wherein the minimum predetermined braking force is between 10% and 30% of the maximum braking force.

3. A transmission control system adapted for controlling the operation of a vehicle automatic transmission constructed in accordance with claim 1 further including fuel flow sensing means for detecting when the fuel flow to the engine is at or below a predetermined value, means interconnecting the flow sensing means and the control means, the control means including means actuating the interrupting means only when the speed sensing means indicates that the vehicle speed is at or below the predetermined value, the brake sensing means indicates that the vehicle brakes have been applied and the fuel flow sensing means indicates that the fuel flow is at or below the predetermined value whereby the vehicle operator may restore the driving connection or prevent actuation of the interrupting means by engaging an accelerator pedal.

4. A transmission control system adapted for controlling the operation of a vehicle automatic transmission constructed in accordance with claim 1 wherein the interrupting means comprises a cut-off clutch and the control means comprises valve means for operating hydraulic controls for the cut-off clutch.

5. A transmission control system adapted for controlling the operation of a vehicle automatic transmission constructed in accordance with claim 1 wherein the vehicle includes a hydraulic braking system and the brake sensing means comprises a pressure sensitive switch operatively connected to the braking system.

6. A transmission control system adapted for controlling the operation of a vehicle automatic transmission constructed in accordance with claim 1 wherein each sensing means comprises electrical switch means and the control means comprises an electromagnetic valve having a coil, each of the sensing means being electrically interconnected in a parallel circuit for energizing the coil.

7. A transmission control system adapted for controlling the operation of a vehicle automatic transmission constructed in accordance with claim 1 wherein the automatic transmission includes a driven speed tachometer for actuation of automatic gear shifting functions, the speed sensing means comprising the tachometer.

8. A transmission control system adapted for controlling the operation of a vehicle automatic transmission constructed in accordance with claim 4 wherein the vehicle includes a driven speed tachometer and an accelerator pedal position transmitter for actuation of automatic gear shifting functions, the speed sensing means comprising the tachometer and the fuel flow sensing means comprising the position transmitter.

9. A method of controlling a vehicle automatic transmission clutch which is operable to interrupt the driving connection between a vehicle engine and a transmission output shaft comprising the steps of:
  (a) monitoring the vehicle speed and detecting when the vehicle speed is at or below a predetermined value,
  (b) monitoring the condition of the vehicle braking system and detecting when the vehicle brakes have been applied,
  (c) disengaging the clutch when both the detected speed is less than or equal to the predetermined value and, at the same time, the vehicle brakes have been applied, and
  (d) reengaging the clutch when the vehicle is stopped during release of the vehicle brakes prior to complete release.

10. A method in accordance with claim 9 further including the steps of:
  (e) monitoring the status of the fuel flow to the engine by observing the position of an accelerator pedal,
  (f) determining when the fuel flow is at or below a predetermined value, the clutch being disengaged when the vehicle speed is at or less than the predetermined value, the vehicle brakes have been applied and the fuel flow is at or less than the predetermined value.

* * * * *